May 28, 1946.  A. McEWEN  2,401,091
AIRBRAKE SLACK ADJUSTER
Filed April 11, 1944
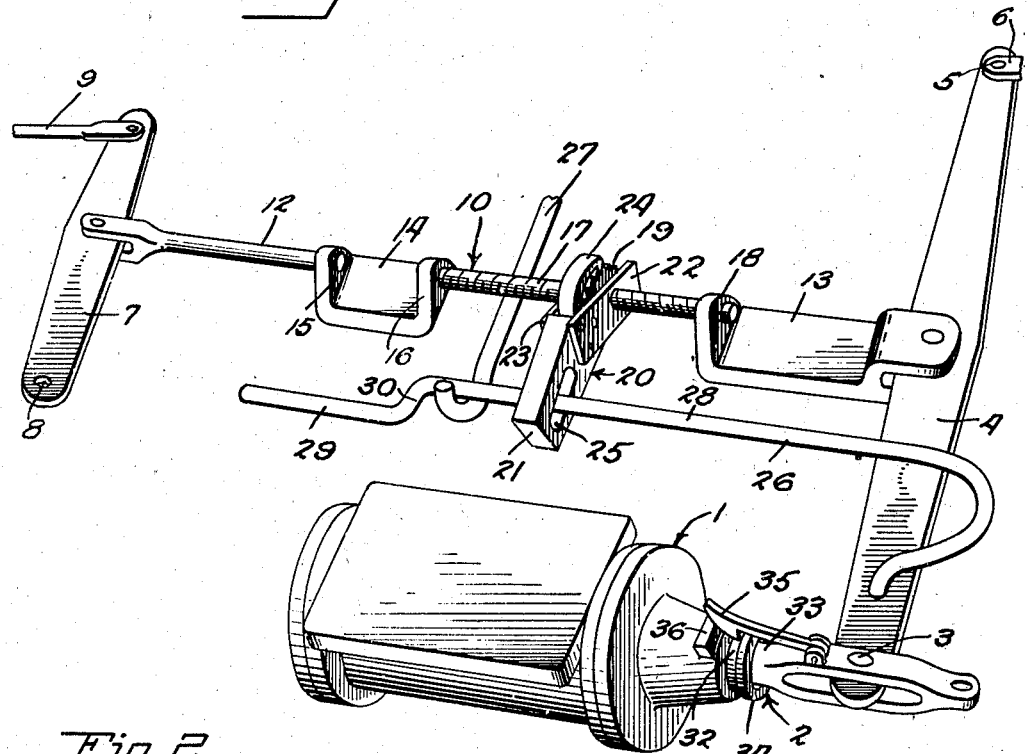
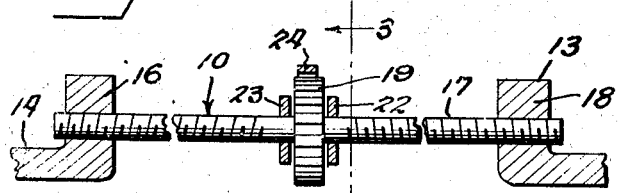
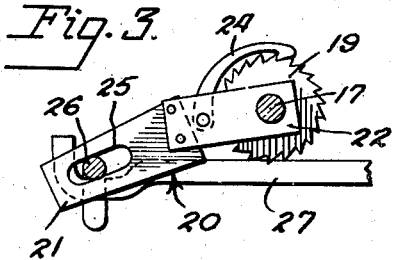
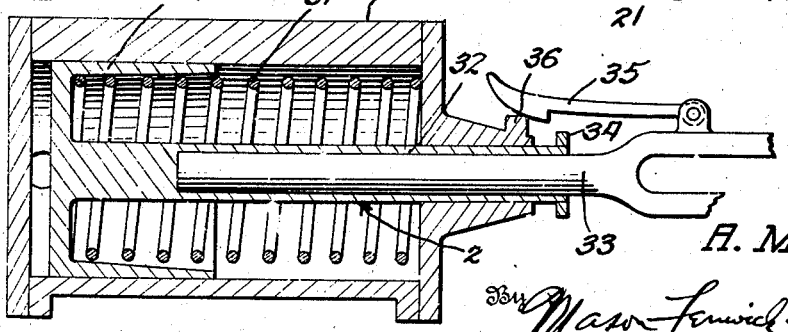
Inventor
A. McEwen
By Mason, Fenwick & Lawrence
Attorneys Patented May 28, 1946

2,401,091

UNITED STATES PATENT OFFICE 2,401,091

AIR BRAKE SLACK ADJUSTER

Alva McEwen, McComb, Miss.

Application April 11, 1944, Serial No. 530,506

1 Claim. (Cl. 188—202)

This invention relates to air brake systems, and more particularly to mechanism for automatically adjusting the throw of the operating levers to maintain standard brake-piston movement, with means for automatically alternately releasing and engaging the hollow piston to permit hand operation of the brake mechanism.

Railroad braking systems are designed for maximum efficiency with a brake piston stroke of approximately seven to nine inches. Naturally, if some means were not employed to maintain the piston stroke constant, the stroke would increase in direct proportion to the wear of the brake shoes and the brakes would become inefficient and ultimately inoperative. Many devices have been suggested to accomplish this purpose.

The object of the present invention is to provide simple, positive means to automatically adjust the brake linkage as the brake is applied to maintain a constant piston stroke regardless of the amount of wear of the brake shoes.

A further object of the invention is to provide such adjusting means positioned at a point in the brake operating mechanism where equal adjustment will be effected on the brakes of both trucks, thus maintaining an equalized braking system and reducing the danger of line defects such as slid flats and brake burns.

Another object of the invention is to provide means to automatically release the brake operating linkage from the hollow-piston at the end of each retraction stroke of the piston, and to automatically connect the piston and linkage at the beginning of the operating stroke. This ensures the brake linkage being returned to brake-releasing position and permits hand operation of the brakes when desired without the heavy drag caused by moving the piston.

Other objects will become apparent from the following description taken in conjunction with the drawing which accompany and form a part of this specification and throughout the several figures of which the same characters of reference are used to denote identical parts.

In the drawing:

Figure 1 is a perspective view of a portion of a conventional brake system including brake piston, levers and linkage with the device of the present invention attached thereto;

Figure 2 is a sectional view showing the adjusting screw and related structure;

Figure 3 is a sectional view taken on the line 3—3 of Figure 2; and,

Figure 4 is a longitudinal sectional view taken thru the brake cylinder, piston and piston rod with the piston-releasing mechanism in place.

Referring to the drawing in detail, 1 represents a conventional brake cylinder having a piston rod 2 extending therefrom. The piston rod 2 is pivotally connected, as at 3, to one end of an operating lever 4 which is pivotally connected at 5 to a brake operating rod 6. A companion operating lever 7 is pivotally mounted as at 8 at the opposite side of the cylinder 1, and connects to a brake operating lever 9. A tierod 10 couples the levers 4 and 7 for simultaneous operation. This is the usual brake system, the movement of the piston 11 operating the lever 4 which in turn thru the tierod 10 operates the lever 7, thus applying the brakes at both ends of the car simultaneously and equally.

To prevent the piston 11 from increasing its stroke as the brakes wear, means are provided to shorten the tierod 10 simultaneously with, and in direct proportion to, the wear of the brake shoes. To accomplish this the tierod is composed of two sections 12 and 13. Part 12 is provided with a U-shaped fitting 14 having one of its upstanding arms 15 secured to the end of the section 12, and its other upstanding arm 16 bored and tapped to receive one end of a screw threaded connector 17. The section 13 is in the form of a bracket pivotally attached to the lever 4 and having an arm 18 threaded to receive the opposite end of the threaded connector 17. The connector 17 is threaded oppositely from its middle outwardly. This construction provides a turnbuckle arrangement whereby rotation of the connector will vary the length of the tierod.

The connector 17 carries a ratchet 19 fixedly positioned midway between its ends. A weighted lever 20 straddles the ratchet and is journaled for free rotation upon the connector. The lever comprises the central arm 21 and the spaced arms 22 and 23 passing on either side of the ratchet. Between the arms 22 and 23 a pawl 24 is mounted for cooperation with the ratchet. As the weighted lever is lifted upwardly the pawl passes over the teeth of the ratchet and as the lever is moved downwardly the pawl engages the teeth and turns the ratchet.

The weighted end of lever 20 is provided with a slot 25 thru which a cam rod 26 passes. The cam rod is loosely connected to the operating lever 4 at a point closely adjacent the connection between the lever 4 and the piston rod 2, whereby the movement of the cam rod will closely approximate that of the brake piston. A guide 27 for the cam rod is rigidly connected to a sill or other fixed portion of the car frame, and supports the outer end of the cam rod. The cam rod is bent to form two guide-contacting surfaces 28 and 29, joined by an incline 30.

In operation, the brake piston moves outwardly rocking the lever 4 which draws the cam rod with it, sliding it across the guide 27. If the brake shoes are properly adjusted, the brakes will be fully applied before the brake piston has moved far enough to bring the inclined portion 30 of the cam rod into contact with the guide 27. As the brakes wear, the piston stroke becomes longer and the movement of the cam rod greater. As the stroke approaches the predetermined limit of efficiency the inclined surface 30 contacts the guide 27 and lifts the cam rod. This rocks the weighted lever upward, shifting the pawl 24 into engagement with another tooth on the ratchet 19. The return stroke of the piston moves the cam rod back to its original position, permitting the weighted lever to drop, rotating the threaded connector 17 and shortening the effective length of the tierod 10. Thus the necessity for a steadily increasing piston stroke is prevented.

It is frequently desirable to operate the brake system by hand. To make the hand operation practical, the system should be relieved of the heavy drag of the hollow piston which would be operating against a vacuum during hand operation. Further, the automatic take-up should function during each manual application of the brakes so that the brake piston will not be subjected to an unusually long stroke during the next mechanical operation of the brakes.

Referring particularly to Figure 4, the usual brake cylinder houses a hollow piston 11 which is normally urged to brake-release position by means of spring 31. The piston rod, which has been referred to in its entirety by the numeral 2, is composed of two parts, the piston rod proper 32 which is hollow and the piston push rod 33 which telescopes within the hollow piston rod. As the hollow piston moves outwardly the push rod seats against the bottom of the recess in the piston rod and is forced outwardly with the piston, thus moving the brake levers to apply the brakes. When the brakes are to be released, the piston moves backward under the influence of the spring 31.

To ensure the levers returning to their inoperative position, the end of the piston rod is provided with an annular collar 34 and the push rod carries a hook 35 fixed upon a horizontal pivot and free to swing in a vertical plane. The hook is so positioned that it will engage the collar 34 so that when the piston returns to inoperative position the push rod and its attached brake linkage will be drawn back with it.

To automatically release the hollow piston from the lever system to provide for hand operation, a bracket 36 is attached to the cylinder head. The hook has its forward end formed as a cam to ride up on the bracket 36 as the piston nears its inner limit to release the hook from the collar. The hook remains disengaged, permitting hand operation of the brakes until such time as the piston again moves outwardly, whereupon the latch slides off of the bracket and reengages the collar on the piston rod.

Although a preferred and practical embodiment of the invention has been shown and described herein, it is to be understood that changes from the exact structure disclosed may be made without departing from the spirit of the invention as defined in the appended claim.

What I claim is:

Slack adjuster for railway car brake system having a brake piston, an operating lever connected to said piston, a second operating lever, and a tierod connecting the levers; a threaded take-up included as a portion of said tierod, a cam rod loosely connected to said first mentioned lever closely adjacent to said brake piston, a fixed guide for said cam rod to lift said cam rod when said cam rod is moved beyond a predetermined distance relative to said fixed guide during the application of the brake system, a weighted lever pivoted on said take-up and having a slot through which said cam rod passes, said weighted lever being positioned between said fixed guide and said first mentioned lever, a ratchet on said take-up, and a pawl carried by said weighted lever for cooperation with said ratchet, whereby said weighted lever will be raised and said pawl advanced on said ratchet when said cam rod is lifted, and said weighted lever will serve to rotate said take-up during subsequent brake release movement.

ALVA McEWEN.